US006871165B2

(12) United States Patent
Aggarwal

(10) Patent No.: US 6,871,165 B2
(45) Date of Patent: Mar. 22, 2005

(54) METHOD AND APPARATUS FOR CLASSIFYING TIME SERIES DATA USING WAVELET BASED APPROACH

(75) Inventor: Charu C. Aggarwal, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 10/601,215

(22) Filed: Jun. 20, 2003

(65) Prior Publication Data

US 2004/0260521 A1 Dec. 23, 2004

(51) Int. Cl.[7] .............................. G06F 15/00; G06K 9/36
(52) U.S. Cl. ......................... 702/189; 382/232; 702/182
(58) Field of Search .......................... 702/83, 182, 189, 702/190; 382/232, 276; 375/240.19, 240.26; 348/387.1; 700/17, 83; 706/21; 707/102

(56) References Cited

U.S. PATENT DOCUMENTS 5,848,193 A * 12/1998 Garcia ......................... 382/232
6,735,550 B1 * 5/2004 Weekley et al. ............. 702/182

OTHER PUBLICATIONS

J. Gehrke et al., "BOAT–Optimistic Decision Tree Construction," SIGMOD Conference, 12 pages, 1999.*
J. Gehrke et al., "Rainforest—A Framework for Fast Decision Tree Construction of Large Datasets," VLDB Conference, 12 pages, 1998.*
J. Gehrke et al., "Data Mining With Decision and Regression Trees," ACM SIGKDD Conference Tutorial, slides KDD99 T1–1 through KDD99 T1–134, 70 pages, 1999.*
D.A. Keim et al., "Wavelets and their Applications in Databases," ICDF Conference, pp. 1–60, 2001.*
J. Gehrke et al., "BOAT–Optimistic Decision Tree Construction," SIGMOD Conference, 12 pages, 1999.
J. Gehrke et al., "Rainforest—A Framework for Fast Decision Tree Construction of Large Datasets," VLDB Conference, 12 pages, 1998.
J. Gehrke et al., "Data Mining With Decision and Regression Trees," ACM SIGKDD Conference Tutorial, slides KDD99 T1–1 through KDD99 T1–134, 70 pages, 1999.
D.A. Keim et al., "Wavelets and their Applications in Databases," ICDE Conference, pp. 1–60, 2001.

* cited by examiner

Primary Examiner—Michael Nghiem
Assistant Examiner—John Le
(74) Attorney, Agent, or Firm—Rafael Perez-Pineiro; Ryan, Mason & Lewis, LLP

(57) ABSTRACT

A technique for effective classification of time series data using a rule-based wavelet decomposition approach. This method is effective in classification of a wide variety of time series data sets. The process uses a combination of wavelet decomposition, discretization and rule generation of training time series data to classify various instances of test time series data. The wavelet decomposition can effectively explore the data at varying levels of granularity to classify instances of the test time series data.

24 Claims, 6 Drawing Sheets

| GRANULARITY (ORDER k) | AVERAGES | DWT COEFFICIENTS |
|---|---|---|
| k = 4 | (8, 6, 2, 3, 4, 6, 6, 5) | — |
| k = 3 | (7, 2.5, 5, 5.5) | (1, −0.5, −1, 0.5) |
| k = 2 | (4.75, 5.25) | (2.25, −0.25) |
| k = 1 | (5) | (−0.25) |

METHOD AND APPARATUS FOR CLASSIFYING TIME SERIES DATA USING WAVELET BASED APPROACH

FIELD OF INVENTION

The present invention is related to data classification and, more particularly, to classifying test time series data in accordance with rules determined from frequent patterns in discretized wavelet decomposed segments of training time series data.

BACKGROUND OF THE INVENTION

The problem of data string classification has been widely studied in the data mining, artificial intelligence, and machine learning communities. Typically, a set of records is established called the training data, in which each record is labeled with a class.

This training data is used to construct a model which relates the features in the data records to a class label. If the class label for a given record is unknown, the model may be used to predict a class label. This problem often arises in the context of customer profiling, target marketing, medical diagnosis, and speech recognition.

Techniques and/or mechanisms which are often used for classification in the data mining domain include decision trees, rule based classifiers, nearest neighbor techniques and neural networks, see, e.g., reports such as R. Duda et al., "Pattern Analysis and Scene Analysis," Wiley 1973; J. Gehrke et al., "Optimistic Decision Tree Construction," SIGMOD Conference, 1999; J. Gehrke et al., "Rainforest—A Framework for Fast Decision Tree Construction of Large Data Sets," VLDB Conference, 1998; and J. Gehrke et al., "Data Mining with Decision Trees," ACM SIGKDD Conference Tutorial, 1999.

Time series data classification is important with respect to financial, medical, and scientific databases. A time series has a set of data records comprising a set of real valued numbers in succession. Each real number corresponds to the value of the time series at a moment in time. Examples of time series data appear in applications concerning the stock market and biological data.

In many cases, the classification behavior of the time series may be stored in portions of the time series which cannot be easily determined a-priori. Often the compositional characteristics of a time series may contain important characteristics which reflect its classification behavior. Typically, techniques used to classify characteristics of time series data utilize an event-based or a global classification system, but not both. However, the important characteristics may be hidden in local characteristics of the string or in more global portions. The data is also typically stored in a compressed form (e.g., GZIP). Using current classification techniques, the compressed format makes it unclear as to which subset of the series to pick. It is also unclear as to which granularity to pick and what shapes result in the corresponding characteristics. Therefore, the data must be decompressed before it can be used with these techniques. Thus, a need exists for improved time series data classification techniques which overcome these and other limitations.

SUMMARY OF THE INVENTION

The present invention discloses a data classification technique. More particularly, the invention classifies test time series data in accordance with rules determined from frequent patterns in discretized wavelet decomposed segments of training time series data.

For example, in one aspect of the invention, a method for classifying test time series data utilizing training time series data comprises the following steps. First, wavelet decompositions of the training time series data are created. Then, the wavelet decomposed segments of the training time series data are discretized. Frequent patterns in discretized wavelet decomposed segments of the training time series data specific to a given class are then determined and rules in the time series data are constructed from these patterns. Finally, the test time series data is classified using these rules.

The above first four steps may be preprocessing steps, involving training time series data, whereas the final step may be executed in an online fashion for individual test records. If executed in an online fashion, the user is able to obtain computational results in real time as opposed to waiting for batch processing.

Advantageously, the inventive technique may be useful for selectivity estimation with compressed data, since the data can be seen and understood when in the compressed form. Additionally, the inventive technique allows for ease in classifying time series data a-priori. Thus, the wavelet decomposition can effectively explore the data at varying levels of granularity to classify instances of the time series data.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENT

Figure 1:
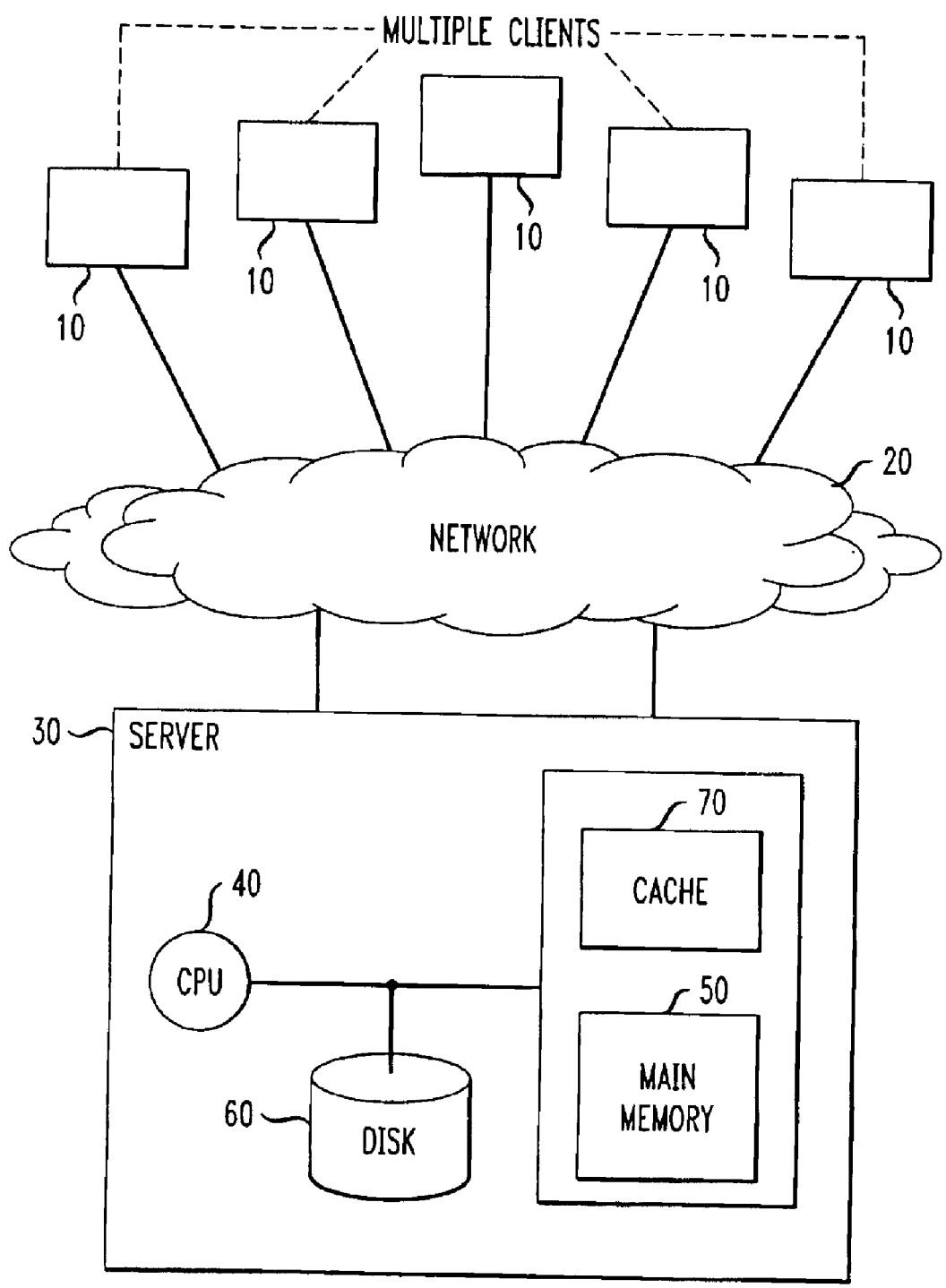
FIG. 1 is a block diagram illustrating a hardware implementation suitable for employing methodologies, according to an embodiment of the present invention.

The following description will illustrate the invention using an exemplary data processing system architecture. It should be understood, however, that the invention is not limited to use with any particular system architecture. The invention is instead more generally applicable to any data processing system in which it is desirable to perform efficient and effective time series data classification.

As will be illustrated in detail below, the present invention introduces a wavelet based approach for classifying test time series data which is effective over a wide range of data sets. The test time series data classification is performed in accordance with rules determined from frequent patterns in discretized wavelet decomposed segments of training time series data. Such a technique has the advantage of allowing data to be seen and understood when in the compressed form, and allowing time series data to be classified a-priori. Wavelet decomposition can effectively explore the data at varying levels of granularity to classify instances of the time series data.

A training database D1 contains N time series, and the length of each series is denoted by d. Along with each record in training database D1, a set of i class labels are drawn from $C_1$ through $C_i$. The classification model is constructed using the records in training database D1 along with their corresponding class labels.

The present invention utilizes a method referred to as the Haar Wavelet (see, e.g., D. A. Keim et al., "Wavelets and their Applications in Databases," ICDE Conference, 2001). The wavelet technique creates a decomposition of the data characteristics into a set of wavelet functions and basis functions. The higher order coefficients of: the decomposition illustrate the broad trends in the data, whereas the more localized trends are captured by the lower order coefficients. This results in a multi-resolution property that can be utilized to find trends of different granularity.

It is assumed that the length q of the series is a power of 2. The Haar Wavelet decomposition defines $2^{(k-1)}$ coefficients of order k. Each of these $2^{(k-1)}$ coefficients corresponds to a contiguous portion of the time series of length $q/2^{(k-1)}$. The i-th of these $2^{(k-1)}$ coefficients corresponds to the segment in the series starting from position $(i-1)*q/2^{(k-1)}+1$ to position $i*q/2^{(k-1)}$. This coefficient is denoted as $\psi_k^i$, and the corresponding time series segment is denoted as $S_k^i$. The average value of the first half of the $S_k^i$ is denoted as $a_k^i$, and the second half is denoted as $b_k^i$. The value of $\psi_k^i$ is given by $(a_k^i - b_k^i)/2$. More formally, if $\Phi_k^i$ denotes the average value of the $S_k^i$, then the value of $\psi_k^i$ can be defined recursively as follows:

$$\psi_k^i = \frac{\phi_{k+1}^{2i-1} - \phi_{k+1}^{2r}}{2}$$

The set of Haar coefficients is defined by the $\psi_k^i$ coefficients of order 1 to $\log_2(q)$. In addition, the global average $\Phi_1^i$ is required for the purpose of perfect reconstruction. The coefficients of different order provide an understanding of the major trends in the data at a particular level of granularity. For example, the coefficient $\psi_k^i$ is half the quantity by which the first half of the segment $S_k^i$ is larger than the second half of the same segment. Since larger values of k correspond to geometrically reducing segment sizes, it is possible to gain an understanding of the basic trends at different levels of granularity.

Figures 6, 7:
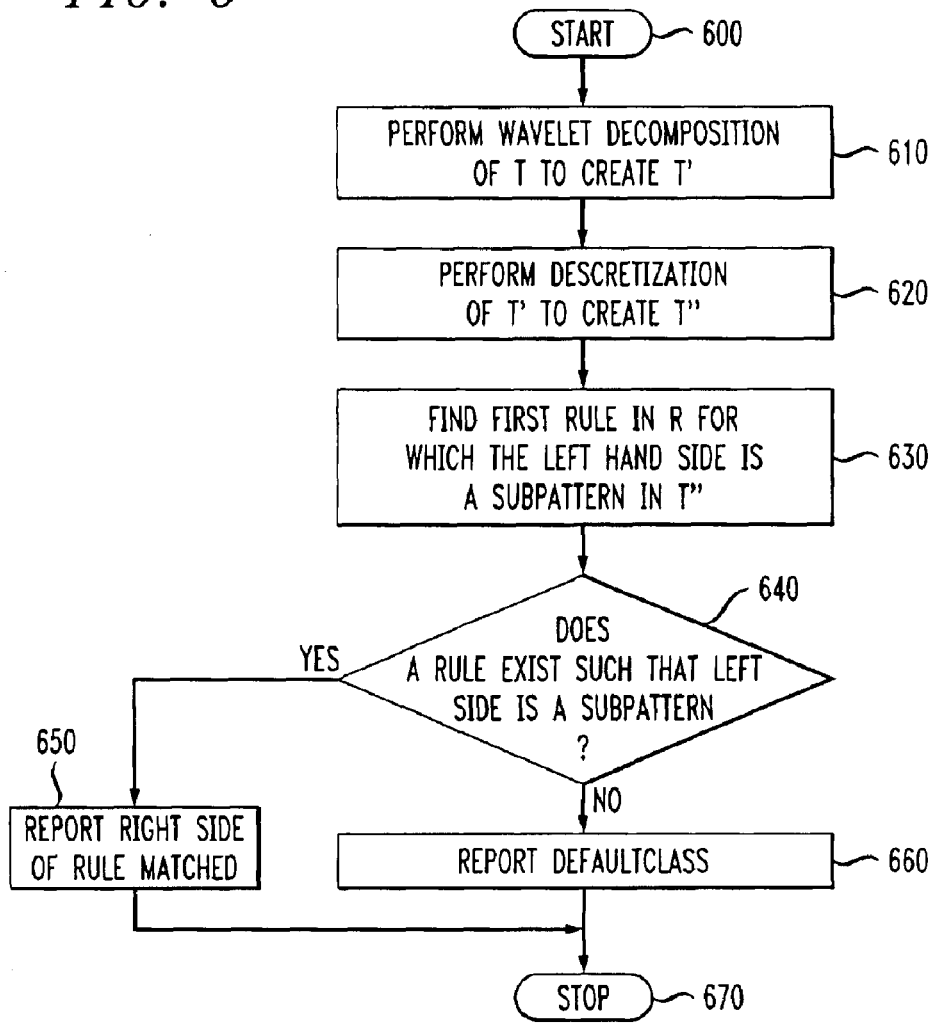
FIG. 6 is a flow diagram illustrating a frequent pattern classification methodology, according to an embodiment of the present invention.
FIG. 7 is a table illustrating wavelet decomposition of a given sequence.

The Haar wavelet makes it very easy to compute coefficients by a sequence of averaging and differencing operations. The table in FIG. 7 illustrates how the wavelet coefficients are computed for the case of the sequence (8, 6, 2, 3, 4, 6, 6, 5).

Referring initially to FIG. 1, a block diagram illustrates a hardware implementation suitable for employing methodologies, according to an embodiment of the present invention. As illustrated, an exemplary system comprises client devices 10 coupled via a large network 20 to a server 30. Server 30 may comprise a central processing unit (CPU) 40 coupled to a main memory 50 and a disk 60. Server 30 may also comprise a cache 70 in order to speed up calculations. It is assumed that multiple clients 10 can interact with server 30 over large network 20. It is to be appreciated that network 20 may be a public information network such as, for example, the Internet or World Wide Web, however, the clients and server may alternatively be connected via a private network, a local area network, or some other suitable network.

The data classification computations of the invention are performed at CPU 40 on server 30 and sent to client devices 10. It is to be understood that a single client device 10 issues a request and also supplies data sets to server 30. However, all or portions of the data sets to be processed may already be available at server 30 (e.g., on disk 60), or may be accessible by server 30. Main memory 50 is used to store some or all of the intermediate results performed during the computations. Results of these computations are then returned to the requesting client device 10.

In one preferred embodiment, software components including instructions or code for performing the methodologies of the invention, as described herein, may be stored in one or more memory devices described above with respect to the server and, when ready to be utilized, loaded in part or in whole and executed by CPU 40.

Figure 2:
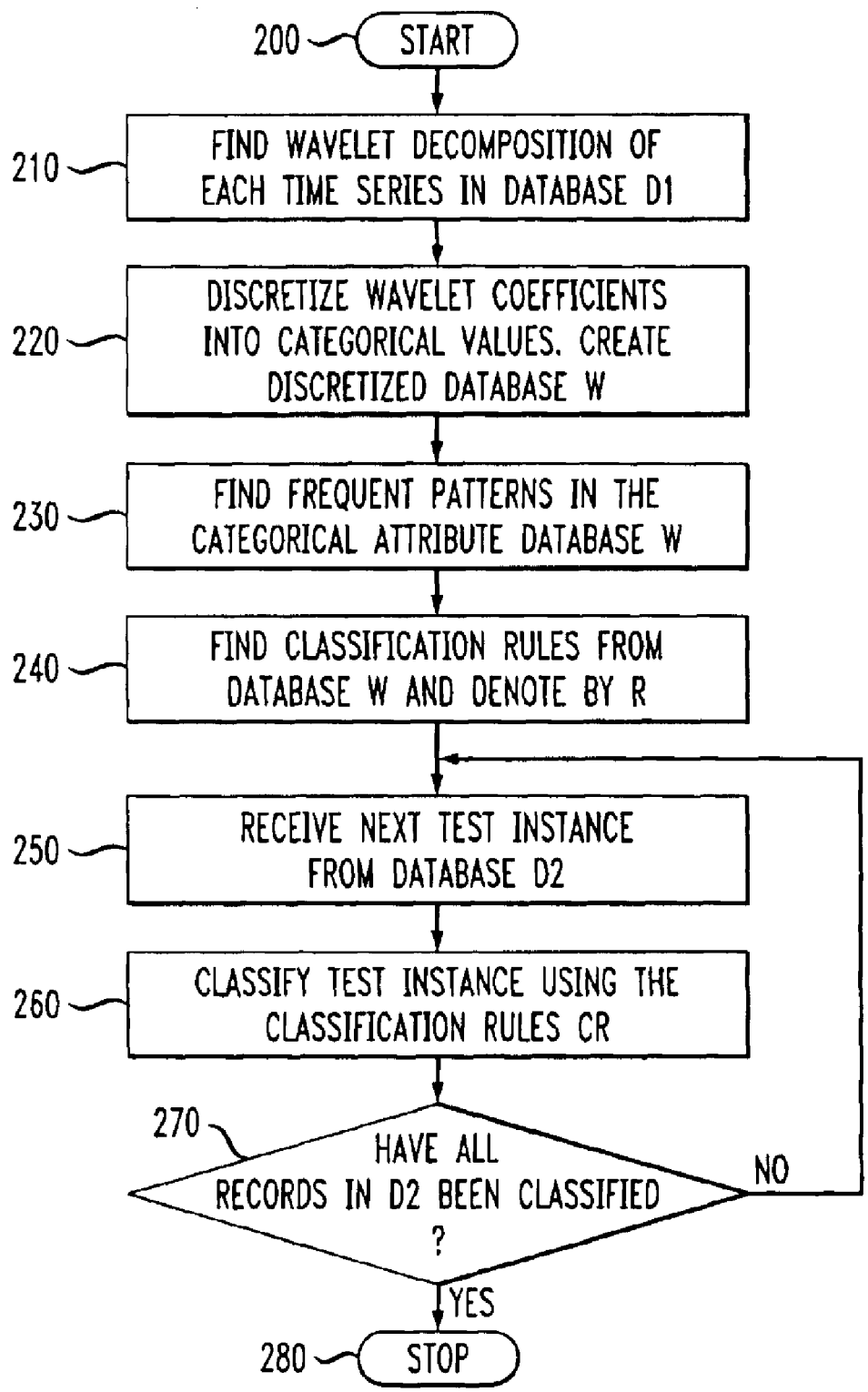
FIG. 2 is a flow diagram illustrating a time series data classification methodology, according to an embodiment of the present invention.

Referring now to FIG. 2, a flow diagram illustrates a time series data classification methodology, according to an embodiment of the present invention. In this embodiment, training database D1 and test database D2 are input in step 200. Training database D1 contains training data which contains class labels attached to each record. Test database D2 contains test data, or test instances T, that do not contain class labels attached to each record. Step 210 finds wavelet decomposition of each time series in training database D1. The process of decomposing the data into wavelets having coefficients is well known and has also been described above. In step 220, the wavelet coefficients are discretized into categorical values. These values are used to create the discretized database W. This process is described in more detail in FIG. 3. In step 230, frequent patterns are determined from these categorical values. This process is described in more detail in FIG. 4. The set of classification rules from the discretized database W, denoted by R, are found in step 240. This process is described in more detail in FIG. 5. These rules are used extensively for the classification process in the loop of steps 250 through 270. In step 250, a test instance T, or test data, is received from test database D2. Test instance T is classified in step 260 using the set of rules R which were generated in step 240. A more detailed description of step 260 is provided in FIG. 6. In step 270, the records in test database D2 are checked. If the records are not all classified, the methodology loops back to step 250. If the records are all classified, the methodology terminates at step 280.

Figure 3:
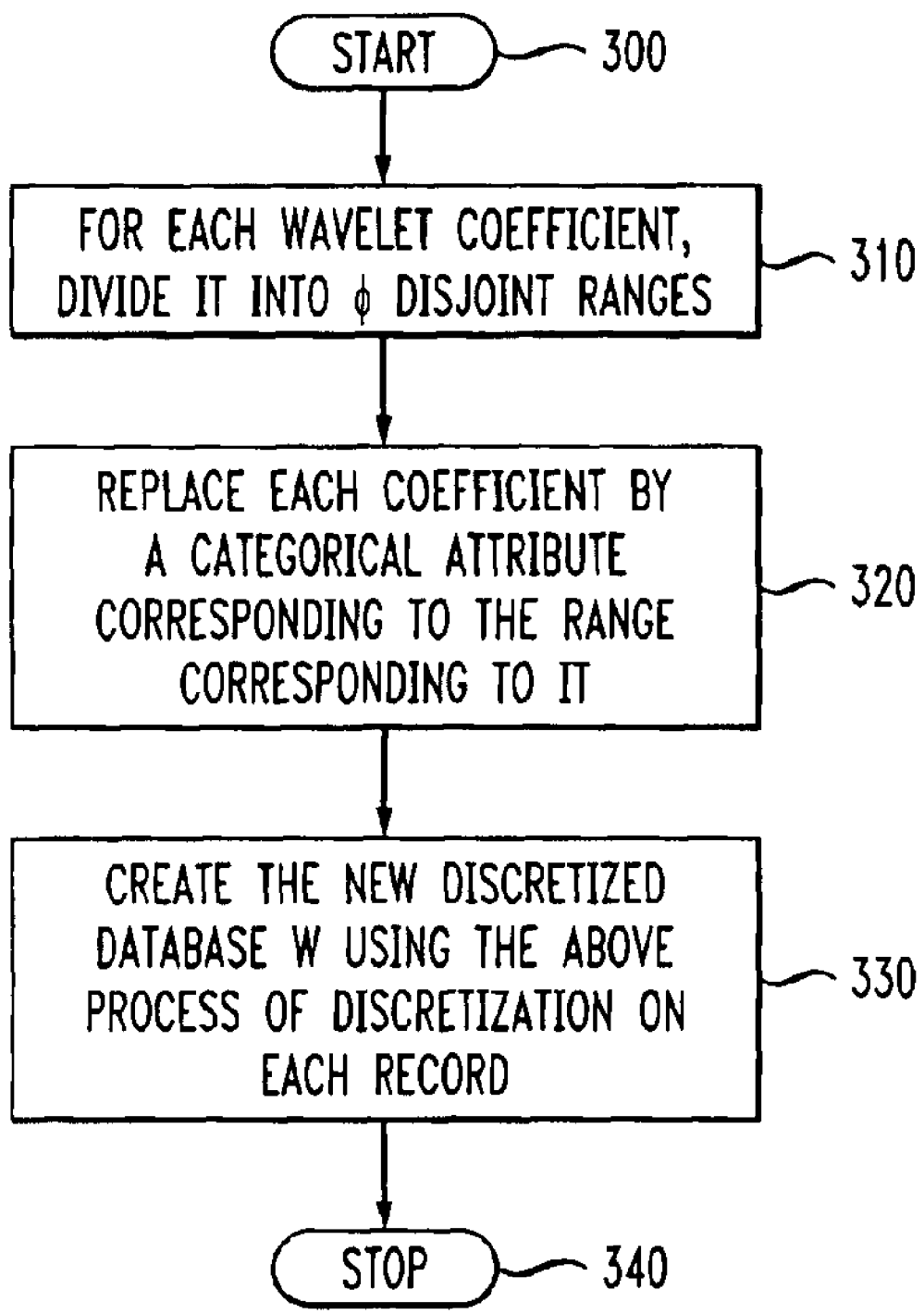
FIG. 3 is a flow diagram illustrating a discretization of wavelet decomposition methodology, according to an embodiment of the present invention.

Referring now to FIG. 3, a flow diagram illustrates a discretization of wavelet decomposition methodology, according to an embodiment of the present invention. This figure can also be considered a detailed description of step 220 of FIG. 2. The methodology begins at step 300 where wavelet decompositions of each time series in training database D1 are input. In step 310, each wavelet coefficient is discretized into $\phi$ disjoint ranges. In step 320, each wavelet coefficient is replaced by a categorical attribute value. This value is determined by the range corresponding to the categorical attribute. This process is applied to each record in training database D1 resulting in discretized database W in step 330. The methodology terminates at block 340.

Figure 4:
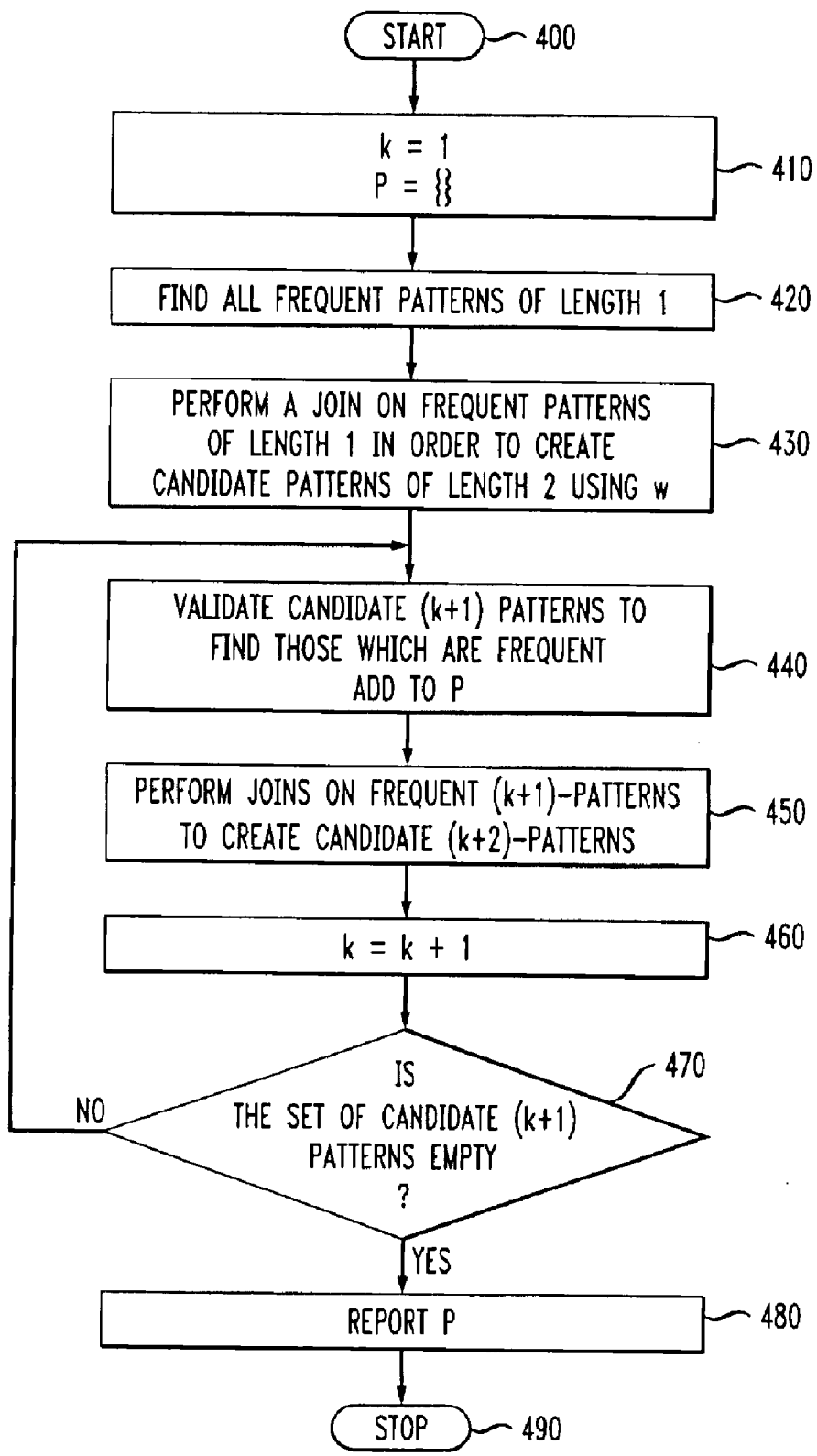
FIG. 4 is a flow diagram illustrating a determination of frequent patterns methodology, according to an embodiment of the present invention.

Referring now to FIG. 4, a flow diagram illustrates a determination of frequent patterns methodology, according to an embodiment of the present invention. This figure can also be considered a detailed description of step 230 of FIG. 2. The methodology begins at step 400 where discretized database W, a support requirement s, and a width value w are input. Width value w denotes the maximum gap between two successive coefficients. In step 410, the value of k, or the pattern length, is set to 1, and a set of frequent patterns P is set to null. In step 420, all frequent patterns having a length 1 are found. This is achieved by enumerating the supports of all patterns having a length 1. In step 430, a join operation is performed on these frequent patterns having a length 1 to create candidate patterns having a length 2. The candidate patterns having a length 2 are created in such a way that there is a distance of at most width w between their positions in the time series. In step 440, candidate (k+1)-patterns are validated to determine those patterns which are frequent. This process of validation is performed by checking the number of records in training database D1 for which the pattern is a substring. If the fraction of records having the pattern as a substring in training database D1 exceeds the support requirement s, then the patterns are said to be frequent. These patterns are added to P.

In step 450, join operations are performed on frequent (k+1)-patterns to create candidate (k+2)-patterns. In order to perform a join operation, the two patterns need to have a common segment length of at least (k−1). Consider, for example the two patterns ADGC and DGCL. The subpatterns DGC are common between the two series. The join of the two patterns is given by ADGCL. In step 460, k is increased by 1. The candidate (k+1)-patterns are checked in step 470. If (k+1)-patterns remain, step 440 is repeated, otherwise, step 480 is performed and P is reported. The methodology terminates in step 490.

Figure 5:
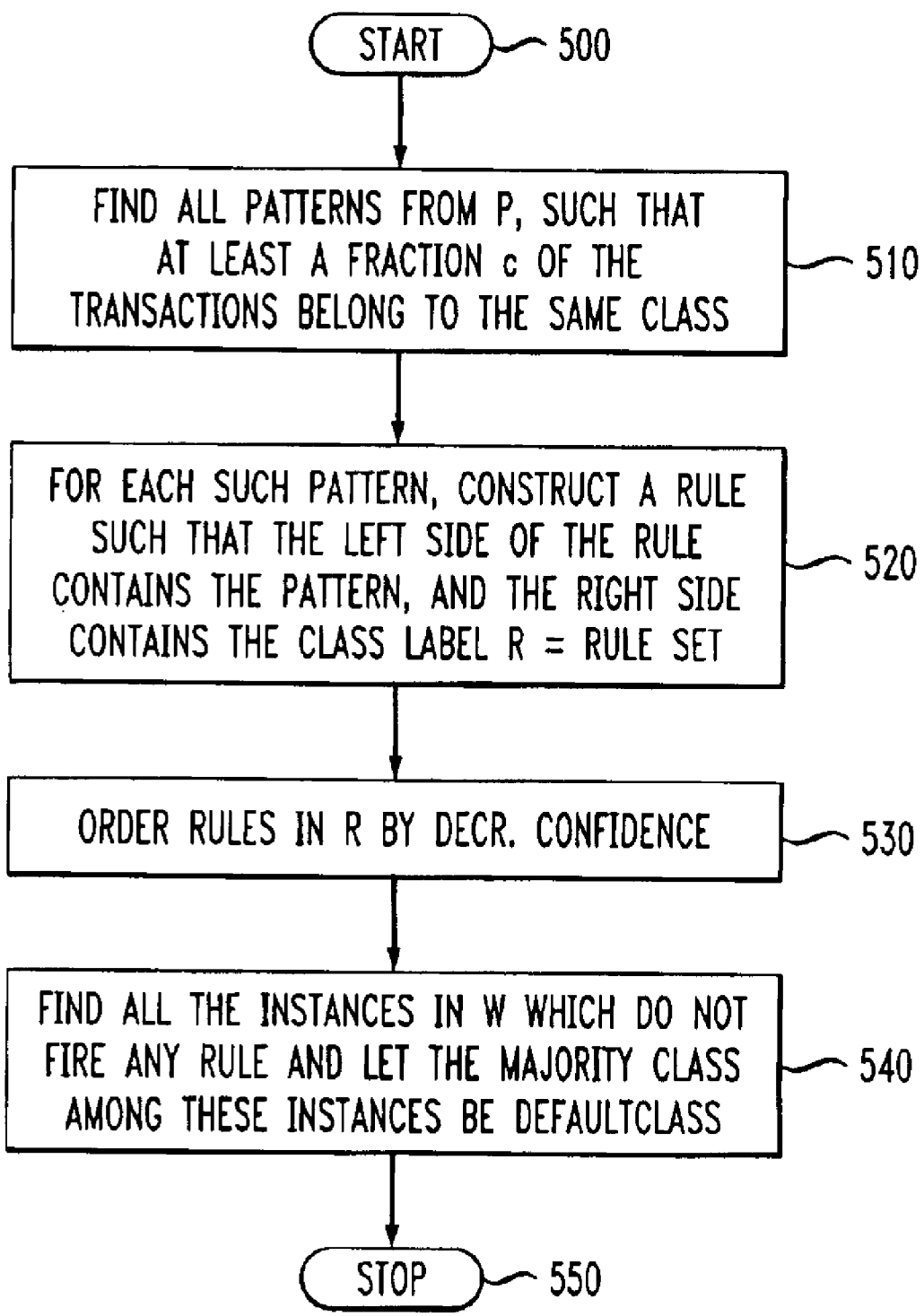
FIG. 5 is a flow diagram illustrating a rule determination methodology, according to an embodiment of the present invention.

Referring now to FIG. 5, a flow diagram illustrates a rule determination methodology, according to an embodiment of the present invention. This figure can also be considered a detailed description of step 240 of FIG. 2. The methodology begins at step 500 where patterns p, discretized database W, and a confidence fraction c, are input. In step 510, all patterns p from set of frequent patterns P are found that have at least confidence fraction c of the records belonging to the same class. Each of these patterns is highly indicative of a particular class in the data. In step 520, a set of rules R is created using these patterns. If p is a pattern which is highly indicative of the class $C_i$, the rule $p \Rightarrow C_i$ is generated. The left side of the rule contains the pattern and the right side contains the class label. Such rules are generated from each possible pattern in step 530 and ordered by decreasing confidence. A record is said to match a rule when the left hand side of the rule is a subpattern of that record. In step 540, all instances in discretized database W are found which do not match (i.e., do not "fire") any rule. The majority class among these instances is referred to as the default class. The methodology terminates in step 550.

Referring now to FIG. 6, a flow diagram illustrates a frequent pattern classification methodology, according to an embodiment of the present invention. This figure can also be considered a detailed description of step 260 of FIG. 2. The methodology begins at step 600 where a test instance T from test database D2 is input. In step 610, wavelet decomposition is performed on test instance T from test database D2, to create a wavelet decomposed test instance T'. The process of wavelet decomposition is well known and has also been described above in detail. In step 620, discretization of wavelet decomposed test instance T' is performed to create discretized wavelet decomposed test instance T". Next, the rules generated by the process in FIG. 5 are used to classify discretized wavelet decomposed test instance T". In step 630, the first rule in the set of rules R is found whose pattern (left hand side) is a subpattern in discretized wavelet decomposed test instance T'. Step 640 checks if such a rule exists. If a rule exists, the class (the right hand side) is reported as the relevant class in step 650. If a rule does not exist, the default class is reported in step 660. The methodology terminates in step 670.

Accordingly, as described herein, the present invention is related to data classification in accordance with rules determined from frequent patterns in discretized wavelet decomposed segments of training time series data. The inventive data classification techniques are applicable to a large number of applications such as decision trees, rule based classifiers, nearest neighbor techniques and neural networks.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of classifying at least one test time series data set utilizing at least one training time series data set comprising the steps of:

creating wavelet decomposed segments of the at least one training time series data set;

discretizing the wavelet decomposed segments of the at least one training time series data set;

determining one or more frequent patterns in the discretized wavelet decomposed segments of the at least one training time series data set;

determining rules from the one or more frequent patterns in the discretized wavelet decomposed segments; and classifying one or more frequent patterns in the at least one test time series data set according to the rules.

2. The method of claim 1, wherein the step of determining one or more frequent patterns is based on user-specified support and width values.

3. The method of claim 1, wherein the step of determining one or more frequent patterns is an iterative process using frequent k-patterns to generate candidate (k+1)-patterns.

4. The method of claim 1, wherein the step of discretizing the wavelet decomposed segments comprises creating a set of categorical records on which the one or more frequent patterns may be found.

5. The method of claim 1, further comprising the step of determining rules of a user-specified level of confidence.

6. The method of claim 5, further comprising the step of sorting the rules in order of decreasing confidence.

7. The method of claim 6, wherein the step of classifying the one or more frequent patterns comprises reporting a class label of a highest confidence rule matched by a given data record of the at least one test time series data set.

8. The method of claim 5, further comprising the step of determining a default class using the at least one training time series data set and the rules generated.

9. The method of claim 8, wherein the default class is a majority class of data instances which do not match any rule.

10. The method of claim 8, further comprising the step of reporting the default class as a class label when there is no matching rule for a data record of the at least one test time series data set.

11. The method of claim 1, wherein the step of classifying the one or more frequent patterns comprises the steps of:

performing wavelet decomposition to a test instance of the at least one test time series data set;

discretizing the wavelet decomposed segments of the test instance; and finding a rule having a pattern that is a subpattern in the discretized wavelet decomposed segments of the test instance.

12. Apparatus for classifying a time series data, the apparatus comprising:

a memory; and at least one processor, coupled to the memory operative to: (i) create wavelet decomposed segments of the training time series data set; (ii) discretize wavelet decomposed segments of the training time series data set; (iii) determine one or more frequent patterns in discretized wavelet decomposed segments of the training time series data set; (iv) determine rules from one or more frequent patterns in the discretized wavelet decomposed segments; and (v) classify one or more frequent patterns in the test time series data set according to the rules.

13. The apparatus of claim 12, wherein the operation of determining one or more frequent patterns is based on user-specified support and width values.

14. The apparatus of claim 12, wherein the operation of determining one or more frequent patterns is an iterative process using frequent k-patterns to generate candidate (k+1)-patterns.

15. The apparatus of claim 12, wherein the operation of discretizing the wavelet decomposed segments comprises creating a set of categorical records on which the one or more frequent patterns may be found.

16. The apparatus of claim 12, wherein the at least one processor is further operative to determine rules of a user-specified level of confidence.

17. The apparatus of claim 16, wherein the at least one processor is further operative to sort the rules in order of decreasing confidence.

18. The apparatus of claim 17, wherein the operation of classifying the one or more frequent patterns comprises reporting a class label of a highest confidence rule matched by a given data record of the at least one test time series data set.

19. The apparatus of claim 16, wherein the at least one processor is further operative to determine a default class using the at least one training time series data set and the rules generated.

20. The apparatus of claim 19, wherein the default class is a majority class of data instances which do not match any rule.

21. The apparatus of claim 19, wherein the at least one processor is further operative to report the default class as a class label when there is no matching rule for a data record of the at least one test time series data set.

22. The apparatus of claim 12, wherein the operation of classifying the one or more frequent patterns comprises:

performing wavelet decomposition to a test instance of the at least one test time series data set;

discretizing the wavelet decomposed segments of the test instance; and finding a rule having a pattern that is a subpattern in the discretized wavelet decomposed segments of the test instance.

23. An article of manufacture for classifying at least one time series data set, comprising a machine readable medium containing one or more programs which when executed implement the steps of:

creating wavelet decomposed segments of the at least one training time series data set;

discretizing the wavelet decomposed segments of the at least one training time series data set;

determining one or more frequent patterns in the discretized wavelet decomposed segments of the at least one training time series data set;

determining rules from the one or more frequent patterns in the discretized wavelet decomposed segments; and classifying one or more frequent patterns in the test time series data set according to the rules.

24. The article of manufacture of claim 23, wherein in the step of determining one or more frequent patterns is based on user-specified support and width values.

* * * * *

UNITED STATES PATENT AND TRADEMARK OFFICE
CERTIFICATE OF CORRECTION

PATENT NO. : 6,871,165 B2
DATED : March 22, 2005
INVENTOR(S) : Charu C. Aggarwal It is certified that error appears in the above-identified patent and that said Letters Patent is hereby corrected as shown below:

Column 3,
Lines 42-46, delete " $\psi_k^i = \dfrac{\phi_{k+1}^{2i-1} - \phi_{k+1}^{2r}}{2}$ " and insert -- $\psi_k^i = \dfrac{\phi_{k+1}^{2i-1} - \phi_{k+1}^{2i}}{2}$ --

Signed and Sealed this

Seventh Day of June, 2005

JON W. DUDAS
*Director of the United States Patent and Trademark Office*